June 6, 1944.  G. I. SIPE  2,350,935
METHOD OF PRODUCING BREAD CRUMBS
Filed April 9, 1940
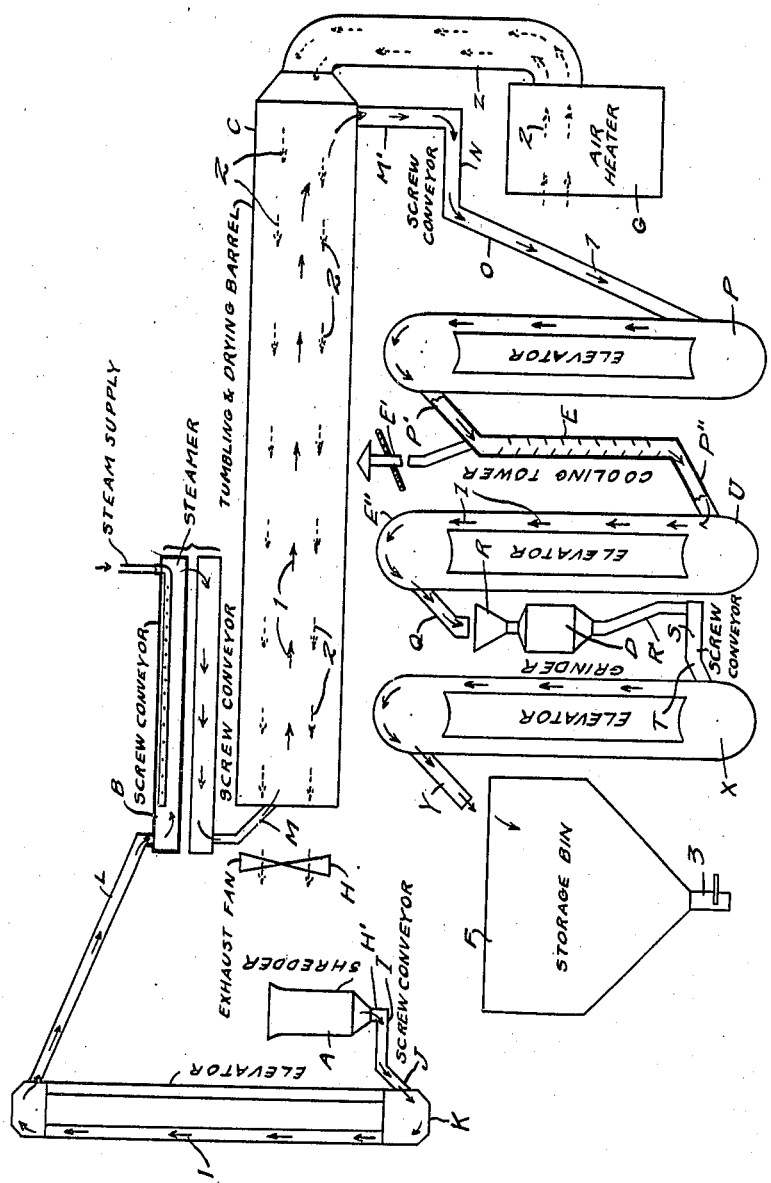
Inventor
GEORGE I. SIPE
By Kimmel & Crowell
Attorneys Patented June 6, 1944

2,350,935

UNITED STATES PATENT OFFICE 2,350,935

METHOD OF PRODUCING BREAD CRUMBS

George I. Sipe, Lancaster, Pa.

Application April 9, 1940, Serial No. 328,782

3 Claims. (Cl. 99—90)

This invention relates to a method designed primarily for producing non-deteriorating bread crumbs, but it is to be understood that a method, in accordance with this invention, is for use in any connection for which it may be found applicable.

An object of this invention is to provide an improved method of producing dried bread crumbs which will not deteriorate under "shelf-age."

Another object of this invention is to provide an improved method of producing bread crumbs wherein the natural taste and flavor of the bread is retained.

A further object of this invention is to provide an improved method of producing bread crumbs which includes shredding or comminuting the bread, steaming the shredded bread, agitating the steamed bread while simultaneously passing a hot air current therethrough, and finally grinding or reducing the shredded bread to the desired crumb size.

The drawing illustrates, by way of example, one form of an apparatus diagrammatically capable of carrying out a method, in accordance with this invention, of producing a non-deteriorating edible material, such as dried bread crumbs of the characteristics aforesaid.

The apparatus as shown by way of example includes a shredder element A for the bread-like material which is to be acted on, a steamer B for the shredded material, the steamer B having an upper and a lower compartment communicating with each other, a combined conveying, tumbling and drying barrel C for the steamed shredded material, a grinder element D for the dried cooled shredded material, a cooling tower E for the dried shredded material, a receiver or storage bin F for the cooled ground material, a hot air source G, a suction device H to provide for inducing a current of hot air passing through the barrel C from the discharge end of the latter to dry, the hot air current travels in a direction opposite to the direction in which the shredded steamed material travels and a natural air draft E' leading from the cooling tower E through the roof E" of the building in which the apparatus is arranged.

The steamer B is to receive the shredded material from element A and by way of example, the material from the latter is conveyed to the steamer B by a chute H', a screw conveyor I, a chute J, an elevator K and a chute L. The barrel C is to receive, at its intake end, the steamed shredded material from the steamer B and by way of example, the steamed material is conducted from steamer B to barrel C by a chute M. The barrel C in connection with the hot air travelling through the latter thoroughly dries the steamed shredded material. The shredded dried material is conveyed from the barrel C to the cooling tower E, for the purpose of cooling such material by a chute M', a conveyor N, a chute O, an elevator P and a spout P' opening into the upper end of the cooling tower and from such tower the cooled dried shredded material is conveyed by a chute P'' from the lower end of tower E into the lower end of an elevator U. The cooled dried shredded material is conducted off from the upper end of elevator U by a depending spout Q which discharges it into a hopper R emptying into the grinder D. The latter acts on such material to grind it to the desired degree. From the grinder D, the ground dried cooled material is conducted into the bottom of an elevator X by means of a depending chute R', a screw conveyor S and a chute T. The ground dried cooled sterile material is discharged into a storage bin F by a downwardly inclined spout Y extended to a point over the top of the bin. The bin F has a valved controlled outlet 3 at its lower end. The hot air is conducted from the heater G to the discharge end of barrel C by a conduit Z. The material conveyed to the receiver F is the dried product and is in condition for packaging.

The travel of the material is continuous through the apparatus from the shredder element A to the receiver F and is indicated by the arrows 1 in full lines. The direction of travel of the hot air through the barrel C is indicated by the arrows 2 in dotted lines.

The chute H' depends from the bottom of element A and discharges into conveyor I. The latter discharges into the chute J which opens into the bottom of elevator K. The chute L leads from the top of elevator K at a downward inclination and discharges into the top of steamer B in proximity to that end thereof which opposes elevator K. The chute M leads from the bottom of steamer B and discharges into the intake end of barrel C. The points of communication of the chutes L, M with the steamer B are disposed in spaced alignment. The chute M' depends from the bottom of barrel C at the discharge end of the latter and opens into the conveyor N. The latter discharges into the upper end of the chute O which depends from conveyor N and inclines towards elevator P. The lower end of chute O opens into the lower portion of elevator P. The spout P' depends from the upper portion of elevator P on that side of the latter opposite the side to which spout O is connected. The spout P' discharges into the cooling tower E. The spout P'' leads from the bottom of tower E and opens into the bottom of elevator U.

The first step of the method is to shred the non-sterile material which is to be made into a comminuted non-deteriorating edible product. The second step of the method is to conduct the shredded material to and to convey it through a steaming compartment and simultaneously with the shredded material passing through said compartment subjecting it to the application of steam. The third step of the method is to subject the steamed shredded material to a combined tumbling and conveying action and simultaneously with the tumbling and conveying action of the steamed shredded material subjecting it to an induced current of hot air travelling in a direction opposite to the direction of travel the steamed shredded material moves in. The fourth step of the method is to subject the sterile material after it is tumbled and subjected to the hot air current and while travelling, to a cooling action under a natural draft. The fifth step of the method is to subject the cooled dried shredded sterile material, while travelling, to a grinding action, and the sixth step is conveying the ground cooled material to a receiver therefor.

The manner of producing the material, in accordance with this invention will now be referred to. The material to be treated, by way of example, will be bread, either in loaves, slices or portions. In carrying out the method the bread is supplied to element A where it is shredded, beat and discharged into the conveying means leading to the steamer element B wherein it is conveyed therethrough in an upper course and a lower course. The upper course moves to the left and the lower course to the right. The courses are separated from each other. As the shredded material travels to the right it is thoroughly steamed. The steamed material passes from the steamer B at its outlet and is conducted to the intake end of the combined conveying, tumbling and drying barrel C. The temperature of the steam supplied to the steamer B will be from 212° F. up, depending upon the quantity of the material. The steamed shredded material is conveyed through the barrel C. Prior to the initial entrance of the steamed shredded material into the barrel C, an induced current of hot air is caused to pass through barrel C from its outlet to its intake end. The shredded steamed material as it is conveyed through barrel C has a tumbling action imparted thereto and is thoroughly dried by the current of hot air passing through barrel C. At the point the material discharges from barrel C it is subjected to the hot air with the temperature of the latter being near its greatest degree, as the material at the point aforesaid is substantially at the intake of hot air for the barrel. By providing for the travelling of a current of hot air in an opposite direction with respect to the direction of travel of the material to its discharge point, it has been found that the material being heated is quickly and thoroughly dried. The temperature of the air discharged into the barrel C will be under 375° F., depending upon the quantity of material discharged into the barrel and upon the speed of movement of the material through the barrel. The induced current of the hot air in a direction from the outlet to the intake of barrel C is had through the conveyed tumbled material through the means of the element H. The shredded dried material is then conveyed through the cooling tower while subjected to a natural draft and from the cooling tower it is conveyed to the grinder D which grinds it to the desired fineness. From the grinder D the ground, cooled material is conveyed to element F and is then in a condition for packaging.

The construction of elements of the apparatus referred to may be by way of example similar to corresponding elements disclosed by my co-pending application aforesaid.

What I claim is:

1. A method of producing dried bread crumbs which includes initially comminuting the bread, steaming the shredded bread, subjecting the steamed shredded bread to a tumbling or agitating action, passing a hot air current over and through the bread while it is being tumbled and finally grinding the bread to crumb size.

2. A method of producing dried bread crumbs which includes initially comminuting the bread, steaming the shredded bread, subjecting the steamed shredded bread to a tumbling or agitating action while simultaneously conveying the shredded bread, passing a hot air current over and through the bread in a direction opposite to the movement of the bread, and finally grinding the bread to crumb size.

3. A method of producing dried bread crumbs which includes initially comminuting the bread, steaming the shredded bread, subjecting the steamed shredded bread to a tumbling or agitating action while simultaneously conveying the shredded bread, passing a hot air current over and through the bread in a direction opposite to the movement of the bread, cooling the shredded bread, and finally grinding the bread to crumb size.

GEORGE I. SIPE.